United States Patent [19]

Miller

[11] Patent Number: 4,939,504

[45] Date of Patent: Jul. 3, 1990

[54] FLUID DETECTING ALARM SYSTEM

[76] Inventor: Robert A. Miller, 315 Nicklaus Blvd., North Fort Myers, Fla. 33903

[21] Appl. No.: 413,130

[22] Filed: Sep. 27, 1989

[51] Int. Cl.⁵ .............................................. G08B 21/00
[52] U.S. Cl. .................................... 340/604; 340/605; 340/620; 200/61.04; 73/304 R
[58] Field of Search ............... 340/604, 605, 616, 620, 340/618; 200/61.04, 61.05; 73/304 R

[56] References Cited

U.S. PATENT DOCUMENTS

| | | | |
|---|---|---|---|
| 3,069,671 | 12/1962 | Taylor | 340/616 |
| 3,492,449 | 1/1970 | Kenny | 200/61.04 |
| 4,126,857 | 11/1978 | Lancia et al. | 340/620 |
| 4,264,902 | 4/1981 | Miller | 340/604 |

*Primary Examiner*—Joseph A. Orsino
*Assistant Examiner*—Jeffery A. Hofsass
*Attorney, Agent, or Firm*—Polster, Polster and Lucchesi

[57] ABSTRACT

A fluid detecting alarm system includes a source of electric current, an alarm electrically connected to the source, a normally open switch electrically connected to the alarm for de-energizing the alarm when the switch is open and energizing the alarm when the switch is in current-conducting condition, and a medium, responsive to the presence of the fluid, for causing the switch to conduct current. In particular, a self-contained liquid water detecting system has a well with a mouth opening through a lower wall of a case. The switch takes the form of two electrodes, spaced apart, and bridged by a dry pulverulent salt, substantially nonconductive when dry and conductive when wet. The open mouth of the well is closed by an adhesive coated foraminous sheet, to retain the salt but to permit liquid water to pass through to wet the salt to cause it to conduct sufficiently to energize the alarm.

5 Claims, 1 Drawing Sheet

FLUID DETECTING ALARM SYSTEM

BACKGROUND OF THE INVENTION

This invention has particular application to the detection of water and the provision of a simple, inexpensive, self-contained device for detecting leakage from water heaters and the like, but its application is not limited thereto.

Almost every householder has experienced a leaking water heater. When the heater is set on a concrete floor with a drain, the leaking water itself is not a serious problem, but in those situations, as in many mobile homes, where the water heater rests on a wooden or composition board floor, and no drain is provided, the result of an undetected leak can be serious, leading, in some cases to the dropping of the entire water heater through the weakened floor, with resulting rupture of pipes and resulting damage to property and the liability of injury to persons. The problem is aggravated by the fact that many water heaters are now placed in areas in which they are out of sight, and, frequently difficult to reach.

One of the objects of this invention is to provide a simple, inexpensive alarm system that will signal the presence of a fluid, such as liquid water.

Another object is to provide such a system that is self-contained, small, unobtrusive, and yet highly efficient.

Other objects will be apparent to those skilled in the art in light of the following description and accompanying drawings.

SUMMARY OF THE INVENTION

In accordance with this invention, generally stated, a fluid detecting alarm system is provided that includes a source of electric current, alarm means electrically connected to the source, a normally open switch means, electrically connected to the alarm means for de-energizing the alarm means when the switch means is open and energizing the alarm means when the switch means is in current conducting condition, and a medium, responsive to the presence of the fluid, for causing the switch to conduct current. In the preferred embodiment, the system is a self-contained liquid water detector, including a case with a well in it, with a mouth opening through a lower wall of the case. A piezo electric sound generator is carried by the case. A battery or battery pack, with two terminals, is connected at one terminal to the sound generator, and at its other terminal, to an electrode projecting into the well. The other side of the sound generator is electrically connected to another electrode projecting into the well. The two electrodes are spaced from one another, and the space between them is bridged with a dry salt, generally common table salt, held in the well by means of a foraminous closure, which can be an adhesive bandage type, with a thin gauze pad on the adhesive side. The bandage can be adhered to an outside surface of a lower wall around the well. When the bandage is exposed to liquid water, the water penetrates the plastic, soaks the gauze and permits the salt to become damp enough to conduct current, completing the circuit and causing the sound generator to sound a piercing alarm. In this embodiment, the two electrodes serve as the switch means, normally open to break the circuit and keep the sound generator de-energized, but acting when the salt is damp, to cause current to flow through the circuit, energizing the sound generating device.

In this, the preferred embodiment, when the alarm system has served its purpose in alerting someone to the fact that the area in which it is lying with the open mouth of the well down is wet, the sound generator can be deactivated by pealing the bandage off, and shaking out the salt. It can then be restored to service by pouring dry salt into the dry well, and putting on a new bandage.

Although the embodiment described is the preferred embodiment, because of its simplicity and the economy of its use, the broad idea is applicable to other devices, such, for example, as for the detection of liquid gasoline or other liquid hydrocarbons, in which case a hydrocarbon-soluble medium can be used to hold a switch, preferably a sealed switch such as a reed switch or mercury switch, open and to cause the switch to close when the medium dissolves or yields.

DESCRIPTION OF THE PREFERRED EMBODIMENT

Figures 1, 2:
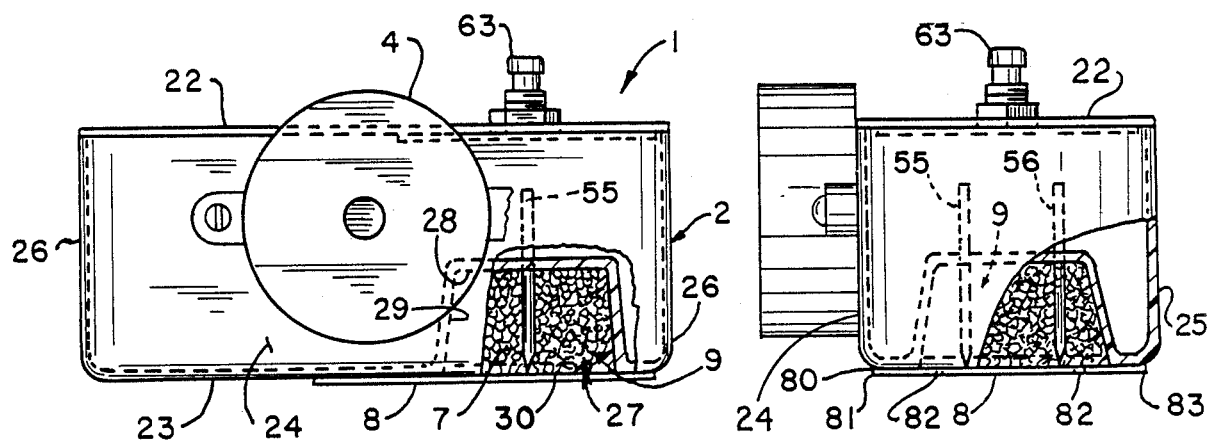
FIG. 1 is a view in side elevation, partly broken away, of one illustrative embodiment of alarm system of this invention.
FIG. 2 is a view in end elevation, partly broken away, of the device shown in FIG. 1.
Figure 3:
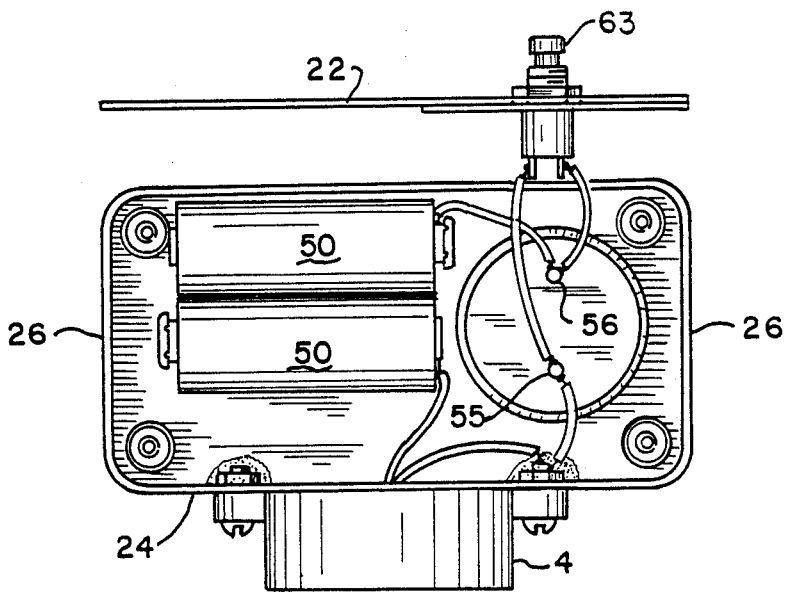
FIG. 3 is a top plan view, with a cover removed to one side, of the device shown in FIGS. 1 and 2.
Figure 4:
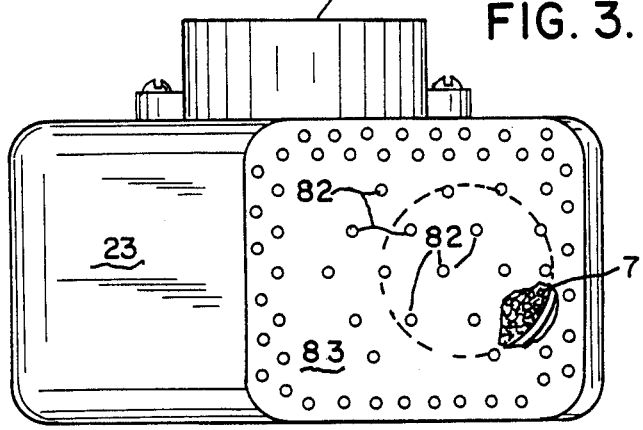
FIG. 4 is a bottom plan view, partly broken away.
Figure 5:
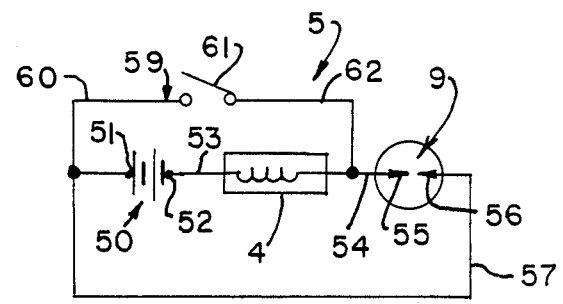
FIG. 5 is a circuit diagram.

Referring now to the drawings, and particularly to FIGS. 1 through 5, reference numeral 1 indicates a self-contained alarm system of this invention. The system 1 includes a case or housing 2, a piezo electric sound generating horn 4, an electrical circuit 5, a switch 9, salt 7 and a closure 8.

The housing 2 is a box with a cover 22, a lower wall 23, a front wall 24, rear wall 25, and end walls 26. Integral with the lower wall 23 is a well 27, defined by a well bottom wall 28 and a well side wall 29. The well opens, through a open mouth 30, through the lower wall 23.

In this embodiment, the horn 4 is mounted on the outside of the front wall 24. The front wall 24 has a hole through it, to permit the attachment of conductors to the horn. The cover 22 of the housing or case 2 also has an aperture through it to receive a stem of a test circuit push bottom, as will be described hereinafter. Suitable fasteners, such as self-tapping screws, can be provided to mount the cover 22 to bosses in the case to permit access to the inside of the housing for replacement of batteries and the like. These can be conventional, and form no part of the invention.

The circuit 5 includes a battery 50 with terminals 51 and 52, a conductor 53 from the terminal 52 to the horn 4, a conductor 54 from the horn to an electrode 55, an electrode 56, and a conductor 57 from the electrode 56 to the battery terminal 51. In the system shown, a test circuit 59 is provided which includes a conductor 60 from the battery terminal 51 to one side of a single pole single throw, normally open switch 61, and a conductor 62 from the other side of the switch 61 to the conductor 54. The switch 61 is closed by manually depressing a switch button 63, a shaft of which extends through the aperture in the cover 22 of the case or housing 2.

As can be seen from FIG. 2, the electrodes 55 and 56 extend through the bottom wall 28 of the well, in parallel, spaced relationship. Normally, the well 27 is filled with dry table salt, and the mouth of the well is covered with the closure 8, which, in this embodiment, takes the form of an adhesive bandage with a foraminous plastic sheet 81, with perforations 82 in it, and a gauze pad 83. A layer of adhesive 80 permits the pad to be stuck to the outer surface of the lower wall 23 of the housing around the mouth 30.

Electrodes 55 and 56 should be made of a conductive metal that is not corroded by the salt. In the illustrative embodiment shown, merely by way of example, the electrodes can be stainless steel pins, parallel to one another and spaced approximately three eighths of an inch. The well can have a volume of approximately one cubic inch, and the mouth opening can be approximately one square inch, or in the embodiment shown, a circular opening with a radius of approximately 0.564 inches. The battery can be a standard nine volt battery and piezo electric sound generators energized by nine volt batteries are commercially available. A standard battery has been found to be capable of sounding a pulsing, loud alarm for several days.

It has been found that a closure of the type described keeps the salt dry, even under conditions of high humidity, but the presence of even as much as a teaspoonful of liquid water will, after a minute or two, cause sufficient current to flow between the electrodes to energize the horn.

As has been indicated, this is the preferred embodiment, and offers numerous advantages both in its manufacture and in its use and reuse.

In applying the principal to the detection of such things as liquid gasoline, a more complicated system must be utilized. By way of example, an enclosed switch normally biased toward closed position can be maintained in an open condition by a pellet of grease-like material or the like, that is insoluble in water but soluble in gasoline. When wet with gasoline, its dissolution permits the turning bias of a spring, in the case of a mercury switch, or the movement of a magnet, in the case of a reed switch, to move the switch to closed position.

Numerous variations in the construction of the alarm system of this invention, within the scope of the appended claims, will occur to those skilled in the art in the light of the foregoing disclosure. By way of example, the test-circuit can be omitted, although it is highly advantageous in permitting simple testing of the condition of the batteries. An A.C. adapter can be used to supply current to the circuit, either exclusively or in combination with a battery used as a back-up if the house current should fail. Different salts from table salt can be used, as long as they ionize in the presence of water, are not strongly hygroscopic, and not excessively corrosive or dangerous to handle. The mouth area and volume of the cavity can be changed, as long as the electrodes are far enough apart to ensure that insufficient current flows to energize the horn when the salt is dry. Different closure materials can be used as long as they are sufficiently permeable to water to permit even small amounts of liquid water to reach the salt, and capable of retaining the salt in place. These are merely illustrative.

Having thus described the invention, what is claimed and desired to be secured by Letters Patent is:

1. A self-contained liquid water detection alarm system comprising a case having a well with a mouth opening through a lower wall of said case, electrically operated alarm means carried by said case, and an electric circuit inside said case, said circuit comprising a battery, electrically connected on one side to said alarm means and on the other side to one of two electrodes projecting into said well, the other of said electrodes being electrically connected to the said alarm means, said electrodes being spaced from one another a distance to ensure that no current will pass between them in the absence of a conducting medium, a dry medium bridging the space between said electrodes, said medium being a pulverulent salt, substantially non-conductive when dry and conductive when wet, and water pervious closure means over said open mouth to retain said salt and to permit ingress of water.

2. The system of claim 1 wherein the salt is sodium chloride.

3. The system of claim 2 wherein the closure is an adhesive-coated pad removably adherent to said lower wall.

4. The system of claim 1 including a test circuit including a normally open manually operable switch for by-passing said electrodes.

5. A liquid detection alarm system comprising a case having a well with a mouth opening through a lower wall of said case, electrically operated alarm means, and an electric circuit inside said case, said circuit being electrically connected to a source of current, on one side to said alarm means and on the other side to a contact of a normally open switch having spaced contacts exposed in said well, another of said switch contacts being electrically connected to said alarm means, said contacts being spaced from one another a distance to ensure that no current will pass between them in the absence of a conducting medium, a dry medium bridging the space between said contacts, said medium being a pulverulent salt, substantially non-conductive when dry and conductive when wet, and water pervious closure means over said open mouth to retain said salt and to permit ingress of water.

* * * * *